No. 811,978. PATENTED FEB. 6, 1906.
N. A. WEIGEN
STRAWBERRY VINE TRIMMER.
APPLICATION FILED JULY 28, 1905.
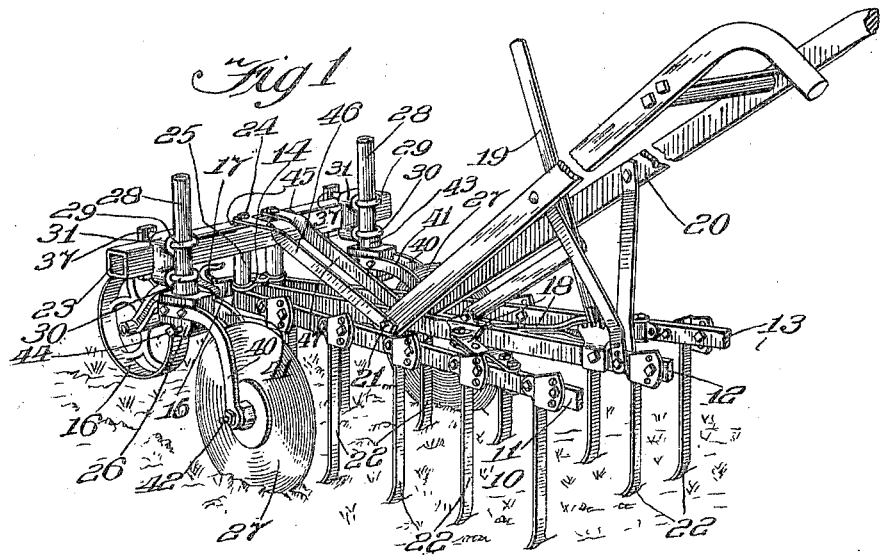
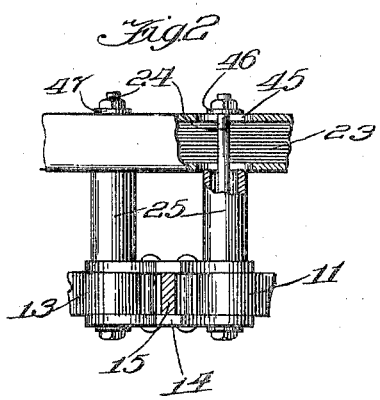
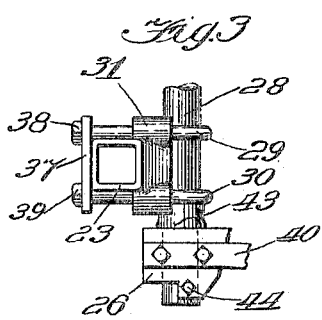
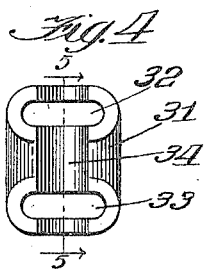
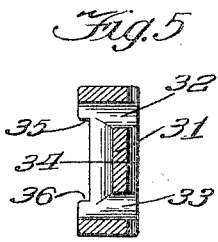
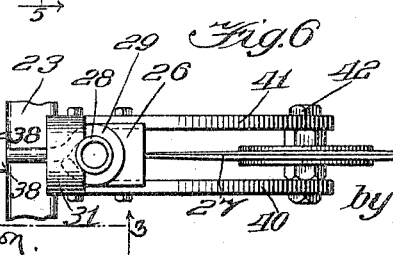
Witnesses:
Wm. N. Yagle
Charles B. Gillson
Inventor:
Nels A. Weigen
by Louis K. Gillson
Atty

UNITED STATES PATENT OFFICE.

NELS A. WEIGEN, OF CLEARLAKE, IOWA.

STRAWBERRY-VINE TRIMMER.

No. 811,978.

Specification of Letters Patent.

Patented Feb. 6, 1906.

Application filed July 28, 1905. Serial No. 271,703.

*To all whom it may concern:*

Be it known that I, NELS A. WEIGEN, a citizen of the United States, and a resident of Clearlake, county of Cerro Gordo, and State of Iowa, have invented certain new and useful Improvements in Strawberry-Vine Trimmers, of which the following is a specification, and which are illustrated in the accompanying drawings, forming a part thereof.

The invention relates to a device adapted for the cultivation of strawberry-plants, and comprises in addition to a cultivator of ordinary form cutters for severing the runners which extend from the vines into the space between the rows, so that they may be uprooted or plowed under by the cultivator-shovels.

In the cultivation of strawberry-plants it has heretofore been necessary to remove the runners by a hand operation, as by the use of a cultivator they are merely turned along the edge of the rows, where they accumulate in a thick mat, some of them taking root and interfering with the growth and bearing of the parent vines. Somewhat better results have been obtained by using a cultivator several times between each two rows of plants, passing it each succeeding time in the opposite direction from that previously employed; but this procedure has been only partially successful as a means of removing the runners and has usually resulted in tearing up many of the vines, owing to the runners becoming tangled in the cultivator-points.

In carrying out the invention there is provided an attachment to be applied to the frame of a cultivator of usual construction and which adjustably supports at either side of the cultivator-shovels a forked head, in which is journaled a rolling cutter or blade.

The object of the invention is to provide a simple and efficient device for cleaning the space between the rows of strawberry-plants, thereby stimulating the growth of the plants and the production of fruit.

The invention consists in the construction and arrangement of parts to be hereinafter described, and claimed, and which is illustrated in the accompanying drawings, in which—

Figure 1 is a perspective view of the device. Fig. 2 is a detail front elevation of the device, some of the parts being broken away and others shown in vertical cross-section. Fig. 3 is a detail side elevation as viewed from the line 3 3 of Fig. 6. Fig. 4 is a rear elevation of a detail of the construction separated from other parts. Fig. 5 is a sectional view on the line 5 5 of Fig. 4; and Fig. 6 is a plan view showing some of the details of construction.

As shown in the drawings, the device includes a cultivator 10, of well-known construction, and having shovel-carrying bars 11, 12, and 13, united at their forward ends in a head 14. One of these bars, as 12, is continued in front of the head, as indicated at 15, and carries a traction-wheel 16 and a draft-hook 17. The bars 11 and 13 are hinged to the head so as to swing in a horizontal plane, their rear ends being adjustably spaced to accommodate the cultivator to various distances between the rows of plants by a toggle mechanism 18, which is controlled by a hand-lever 19. The usual guide-handles 20 are provided and are secured to the intermediate shovel-carrying bar 12 by a bolt 21. The bars 11, 12, and 13 carry points or shares 22, of any convenient form, for cultivating the ground.

A transverse bar 23 is mounted on the cultivator-frame. It is preferably supported by the head 14, to which it is rigidly secured by bolts 24, which also serve as pivot-bolts for attaching the shovel-carrying bars 11 and 13. In order to obtain the required height for the device, the bar 23 is raised from the head by tubular posts or sleeves 25, through which the bolts 24 may pass. This bar extends laterally in either direction beyond the sides of the cultivator and has adjustably mounted upon it, adjacent either end, a forked head 26 for receiving a cutting-blade 27, adapted to roll upon the ground. In order that the position of the blade may be both vertically and laterally adjustable, the construction is most conveniently made, as follows: A post 28 rises from the head 26 and is clamped to the bar 23 by eyebolts 29 and 30, placed one above and the other below the bar. A bracket-block 31, having slotted apertures 32 33 for receiving the heads of the eyebolts and a vertically-disposed groove 34, forming a bearing for the post 28, and suitable shoulders 35 36 for engaging the upper and lower edges of the bar, serves as a seat for the post against the side of the bar. A strap 37, apertured to pass over the two bolts, is applied at the opposite side of the bar and is employed as a clamping-piece against which the nuts 38 39 take a bearing to secure the parts rigidly in position. Forks 40 and 41 are provided for supporting the cutting-blade 27 and extend, preferably, to the rear of and downwardly from the head 26. As shown in the drawings, the cutting-blade 27 is circular and adapted to roll on the ground, turning on a bolt 42, which unites the outer ends of the forks 40 and 41. The head 26 is removably attached to the post 28, being apertured to receive its lower end and taking a bearing against a shoulder 43, formed on the post. It is secured in position by a bolt 44, passing through the head and through the post.

The bar 23 and its appurtenances are preferably employed as an attachment to be applied to any form of cultivator and may be removed therefrom when it is desired to use the cultivator for other purposes. To this end the bolts 24 are provided to take the place of shorter ones usually employed in a cultivator for attaching the shovel-carrying bars 11 and 13, and slotted apertures 45 are formed in the bar 23 to accommodate these bolts when used in connection with cultivators having various widths of head. In order to more rigidly secure the bar 23 in position upon the cultivator, braces 46 47 may be employed, each having one end applied to one of the bolts 24 above the bar and the other end secured to the frame of the cultivator in any convenient manner, as by means of the bolt 21, which also serves as a means for attaching the guide-handles 20.

In using the device the position of the blade 27 will be so adjusted by loosening the eye-bolts 29 and 30 that they engage the ground with sufficient force to cut the runners of the strawberry-plants and so that they pass close to the plants of two adjacent rows when the cultivator is in use. Those runners which extend into the space between the rows will then be severed from the vines by the revolving blades and will be plowed into the ground by the cultivator-points 22. When it is desired to use the cultivator for other purposes, the bar 23 and blades 27 may be entirely removed by taking out the bolts 24. The shovel-carrying bars 11 and 13 will then be attached to the head 14 by shorter bolts, such as are ordinarily used for this purpose, and the braces 46 and 47 may be removed by taking out the bolt 21. This bolt will, however, necessarily be replaced to secure the guide-handles 20 in position after the braces have been taken off.

I claim as my invention—

1. In a strawberry-vine trimmer, in combination, a cultivator-head, shovel-carrying members pivotally united to the head, a transverse bar resting on the head, a cutting-blade adjustably secured to the bar at each side of the head, and means for laterally swinging the shovel-carrying members.

2. In a strawberry-vine trimmer, in combination, a cultivator having a head and shovel-carrying members meeting in the head, a bolt for pivotally uniting one of such members with the head, a transverse bar resting on the cultivator-head and apertured to receive the bolt, and a cutting-blade carried by the bar.

In testimony whereof I have signed my name to this specification in the presence of two subscribing witnesses.

NELS A. WEIGEN.

Witnesses:
S. W. WALLIS,
A. R. SANDRY.